United States Patent [19]

Dobberpuhl

[11] 4,212,364
[45] Jul. 15, 1980

[54] DRIVE AXLE SUPPORT FRAME FOR A WALK-BEHIND, SELF-PROPELLED LAWN MOWER

[75] Inventor: Dale R. Dobberpuhl, Horicon, Wis.

[73] Assignee: Deere & Company, Moline, Ill.

[21] Appl. No.: 969,459

[22] Filed: Dec. 14, 1978

[51] Int. Cl.² ...................... B62D 51/04; A01D 35/26
[52] U.S. Cl. .................................... 180/19 R; 56/17.2; 280/43
[58] Field of Search ............. 180/19 R; 56/17.1, 17.2; 280/43, 43.17

[56] References Cited

U.S. PATENT DOCUMENTS

| | | | |
|---|---|---|---|
| 2,688,224 | 9/1954 | Hainke | 180/19 R |
| 2,941,610 | 6/1960 | Clemson | 180/19 R |
| 2,996,134 | 8/1961 | Muerle et al. | 180/19 R |
| 3,388,759 | 6/1968 | Plamper et al. | 180/19 R |
| 3,411,275 | 11/1968 | Mattson et al. | 180/19 R |

Primary Examiner—John J. Love
Assistant Examiner—Donn McGiehan

[57] ABSTRACT

The rear wheels of a walk-behind, self-propelled lawn mower are fixed to the opposite ends of a drive axle that is rotatably mounted in an axle support frame. The axle support frame is vertically pivotally mounted at the rear of a main frame of the mower and an adjustment mechanism is provided for holding the support frame in selected positions according to the cutting height desired. A cross-shaft is coupled to be driven from the mower engine and is mounted in the support frame, so as to extend along the axis about which the latter is pivotable, and is connected to the drive axle by gearing. A normally disengaged clutch is carried by the cross-shaft for selective engagement to complete a drive connection to the gearing. The drive axle support frame defines a protective guard or shield which extends over the clutch and gearing.

4 Claims, 4 Drawing Figures

DRIVE AXLE SUPPORT FRAME FOR A WALK-BEHIND, SELF-PROPELLED LAWN MOWER

BACKGROUND OF THE INVENTION

The present invention relates to walk-behind self-propelled mowers and more particularly relates to drive wheel mountings for such mowers.

Generally, self-propelled mowers are provided with an engine having a vertical output shaft on which the mower blade is fixed and on which a gear or pulley forming part of a propel drive for the mower is fixed. These propel drives normally include a cross-shaft coupled to be selectively driven from the gear or pulley.

In some propel drives, such as that illustrated in U.S. Pat. No. 2,688,224 issued to Hainke on Sept. 7, 1954, the drive wheels are fixed directly on the ends of the cross-shaft and the cross-shaft is carried by vertically adjustable brackets which effect changes in the cutting height of the mower. Drives of this type have the disadvantage that the drive components coupling the engine output shaft with the cross-shaft must be designed to allow the cross-shaft to be adjusted vertically.

In other propel drives, such as those illustrated in U.S. Pat. No. 2,941,610 issued to Clemson on June 21, 1960 and U.S. Pat. No. 2,996,134 issued to Muerle et al on Aug. 15, 1961, the cross-shaft is rotatably mounted in the main frame of the mower and has gears fixed on its opposite ends and meshed with gears fixed integrally to the drive wheels. The drive wheels are rotatably mounted on stub shafts fixed to brackets mounted for vertical pivoted adjustment about the axis of the cross-shaft. These drives sometimes suffer the disadvantages that the wheels wobble on the stub shafts thus resulting in increased wear between the gears carried by the wheels and the gears fixed to the cross-shaft.

Another disadvantage of both of the aforementioned types of prior art designs is that the wheels must be individually adjusted to alter the cutting height of the mower.

SUMMARY OF THE INVENTION

According to the present invention there is provided an improved drive wheel mounting structure for a walk-behind, self-propelled mower.

A primary object of the invention is to provide a drive wheel mounting structure having sufficient structural strength to maintain proper alignment of propel drive components.

A further object of the invention is to provide a drive wheel mounting structure by which both wheels can be simultaneously vertically adjusted by manipulating a single adjustment lever.

Yet another object of the invention is to provide a drive wheel mounting structure, which, in addition to fulfilling the foregoing objects, also acts as a guard for certain of the propel drive components.

These and other objects will be apparent from reading the ensuing description together with the appended drawings.

The foregoing objects are accomplished by a support frame having opposite ends respectively including axially aligned tubular receptacles which are pivotally secured to a rear projection of the main frame of the mower. A cross-shaft is rotatably received in the tubular receptacles and is coupled to be driven by the mower engine. An axle shaft is also rotatably mounted in the support frame and drive wheels are fixed to its opposite ends. The cross-shaft is made of separate first and second sections joined by a normally disengaged clutch, the second section being driven only when the clutch is engaged and having a gear fixed thereto and meshed with a gear fixed to the drive axle shaft. The support frame is shaped such that it extends about and shields those of the drive components which are associated with the cross-shaft and axle.

DESCRIPTION OF THE PREFERRED EMBODIMENT

Figure 1:
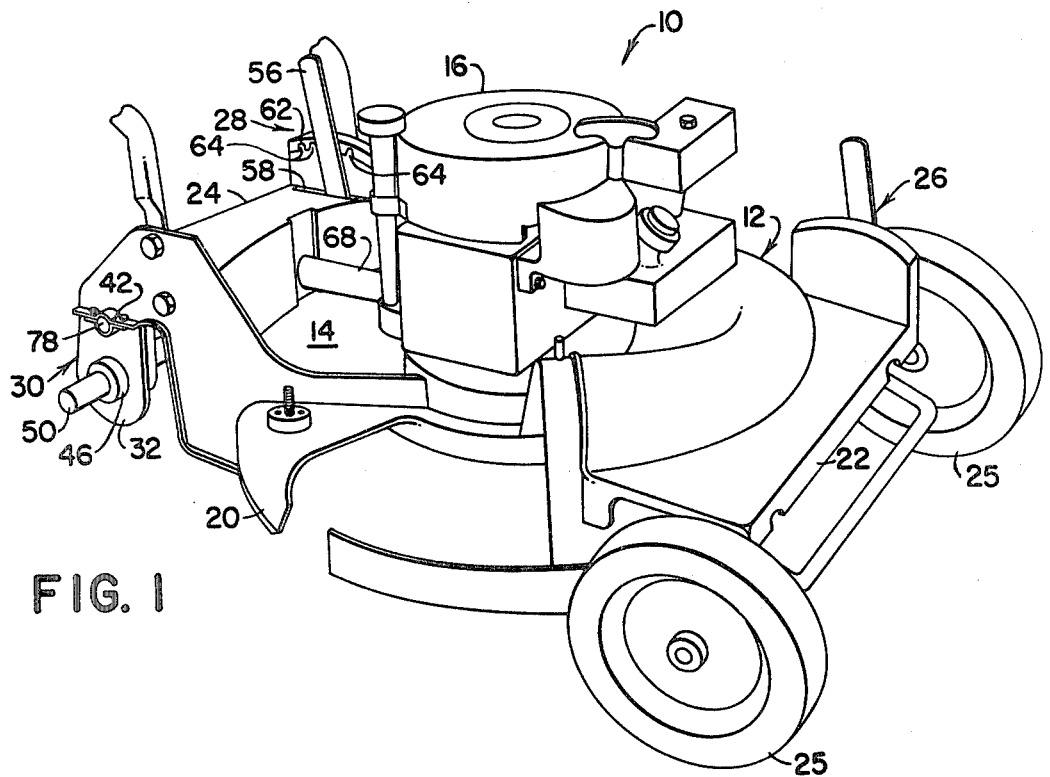
FIG. 1 is a right, front perspective view of a lawn mower constructed in accordance with the present invention.

Referring now to FIG. 1, therein is shown a walk-behind, self-propelled lawn mower indicated in its entirety by the reference numeral 10. The mower 10, includes a frame 12 including a main frame comprising a central horizontal surface 14 on which is mounted an internal combustion engine 16. The engine 16 is of a common type including a vertical output shaft (not shown) to which is fixed a cutting blade 18. The frame 12 is shaped to form a blade housing including a vertical skirt 20 which encircles a path swept by the blade during operation.

The frame 12 includes forward and rearward extensions 22 and 24, respectively. A front pair of support wheels 25 are vertically adjustably mounted to the forward extension 22 by means including an adjustment mechanism 26 while a rear pair of support wheels 27 are vertically adjustably connected to the rearward extension 24 by means including an adjustment mechanism 28. The means by which the front wheels 25 are mounted on the frame extension 22 does not form any portion of the invention and is therefore not discussed in further detail. The contrary is the case relative to the means by which the rear wheels 27 are mounted.

Specifically, the rear wheels 27 are mounted to the rear frame extension 24 by means including a sub-frame or drive axle support frame 30 forming part of the frame 12 and having right and left generally oval shaped, vertically disposed ends 32 and 34 joined by a fore-and-aft curved, transverse central portion 36. Right and left axially aligned cylindrical tubes 38 and 40, respectively, are fixed in the ends 32 and 34 and are rotatably secured in right and left semi-cylindrical surfaces, formed in the underside of the extension, by means of clamps which cooperate with the cylindrical surfaces to form journals 42 and 44. A pair of axle receptacles 46 and 48 are fixed in the ends 32 and 34 in axial alignment with each other and a drive axle 50 is rotatably received in the receptacles 46 and 48. The wheels 27 are fixed to the opposite ends of the axle 50.

The adjustment mechanism 28 includes a handle having an upper free end projecting through a fore-and-aft elongated opening 58 extending vertically through the frame extension 24 adjacent the left end of the latter. The handle 56 has its lower end received in a vertical opening in the central portion 36 of the axle support frame 30 and fixed to the support frame by bolts 60. Fixed to the frame extension 24 alongside the opening 58 is a quadrant-shaped member 62 provided with a plurality of inwardly opening detent notches 64 which an outwardly projecting pin 66 fixed to the lever is selectively receivable to fix the support frame 30 and hence the wheels 27 in selected vertical positions relative to the frame 12.

Figure 2:
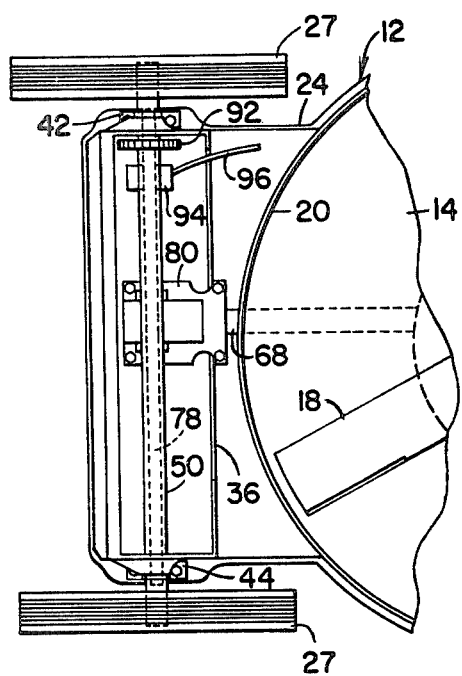
FIG. 2 is a somewhat schematic bottom view of the rear portion of the lawn mower showing the drive axle support frame and associated propel drive components.
Figure 3:
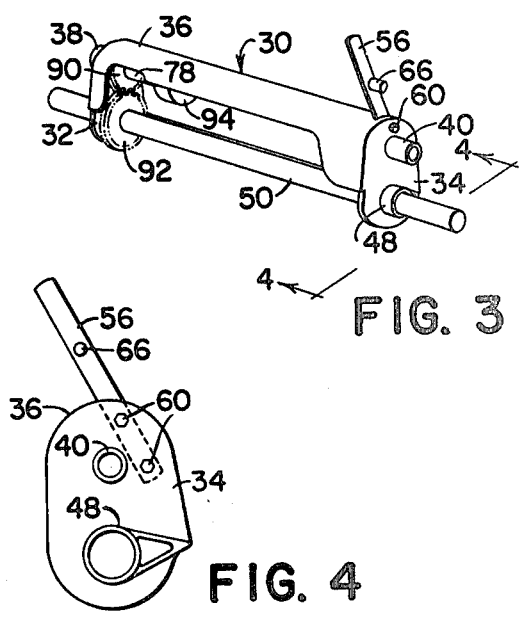
FIG. 3 is a left rear perspective view of the drive axle support frame and associated propel drive components.
Figure 4:
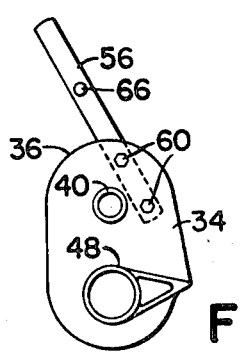
FIG. 4 is a left end view of the drive axle frame taken along line 4—4 of FIG. 3 but with the associated propel drive components removed.

A propel drive train is coupled between the output shaft of the engine 16 and the drive axle 50. The propel drive train includes a fore-and-aft extending power transmission shaft 68 having a forward end preferably coupled to the engine output shaft by gearing (not shown) which may be of any suitable type, an example of which is the worm gear set of the aforementioned Hainke patent. A cross-shaft 78 is rotatably mounted in the cylindrical tubes 38 and 40 and coupled for transmitting torque between the rear end of the shaft 68 and the cross-shaft 78 is gearing contained within a gear box 80. This gearing may also be of any suitable type, an example of which is the bevel gear set of the aforementioned Clemson patent. The cross-shaft 78 has a pinion gear 90 fixed to a right end portion thereof, the gear 90 being constantly meshed with a driven gear 92 fixed to the drive axle 50. The cross-shaft 78 is made of first and second separate sections coupled together by a normally disengaged clutch, indicated schematically at 94 and which is selectively engageable, in response to operation of a control cable 96, to effect torque transmission between the separate sections. As can best be seen in FIGS. 2 and 3, the central portion 36 of the axle frame cooperates with the ends 32 and 34 to form a protective shield for the central portions of the cross-shaft 78 and axle 50 and the propel drive components associated therewith.

The operation of the axle support frame 30 and associated propel drive components is thought to be clear from the foregoing description, suffice it to say, that the frame 30 provides sufficient rigidity to maintain the propel drive components carried thereby in proper working alignment.

I claim:

1. In a self-propelled rotary lawn mower including a main frame defining a blade housing and being supported by front and rear sets of wheels, an engine supported on a central portion of the frame and drive means coupled between the engine and one of the sets of wheels, the improvement residing in a support structure for the one set of wheels, comprising: said frame including an extension elevated above the ground; an axle support frame vertically pivotally connected to the extension for swinging about a transverse axis; adjustment means connected between the main and axle support frames for releasably fixing the axle support frame in selected vertical positions relative to the main frame; said drive means including an axle rotatably supported by the axle support frame, said one set of wheels including a pair of wheels respectively fixed to the opposite ends of the axle; a cross-shaft located on said axis and rotatably supported by the axle support frame; coupling means connected between the cross-shaft and axle for selectively establishing a drive transmitting relationship therebetween; and said axle support frame being in the form of a guard structure having opposite ends joined by a fore-and-aft curved central portion, the opposite ends and central portion of the axle support frame cooperating with the extension of the main frame to form an open-bottomed housing for at least central portions of the axle and cross-shaft and for the coupling means.

2. The lawn mower defined in claim 1 wherein the opposite ends of the axle support frame are respectively formed of a pair of vertical plates; a pair of cylindrical tubular receptacles respectively fixed in the pair of vertical plates and being pivotally connected to the extension of the main frame to thereby establish the pivotal connection between the axle support and main frames; and said cross-shaft being rotatably received in the tubular receptacles to thereby establish its rotatable connection with the sub-frame.

3. In a self-propelled rotary lawn mower including a mower frame defining a blade housing and being supported by front and rear sets of wheels, a cross-shaft rotatably mounted in a rear portion of the frame, an engine mounted on the frame and connected to the cross-shaft for imparting rotation thereto and a transverse drive axle having the rear set of wheels mounted on the opposite ends thereof and being vertically adjustably mounted on the frame and a selectively engageable drive connection apparatus connected between the cross-shaft and the axle for selectively effecting driving of the latter by the former, the improvement residing in the manner of mounting the drive axle on the frame and comprising: said frame including a main frame and a unitary transverse subframe, the latter having opposite end walls joined by a top wall; said cross-shaft and drive axle extending between and being rotatably mounted in the end walls, means connecting the subframe to a rear end portion of the main frame for rotation about an axis passing axially through the cross-shaft; cooperating releasable latch means fixed to the main frame and to the subframe for releasably retaining the subframe in various angular positions about said axis to thereby adjust the vertical disposition of the rear set of wheels relative to the main frame; and said top of the subframe being curved about the cross-shaft and drive connection apparatus.

4. The self-propelled rotary lawn mower defined in claim 3 wherein the rear portion of the main frame defines a pair of transversely spaced, axially aligned semi-cylindrical downwardly facing receptacles, the end walls of said subframe being respectively provided with axially aligned oppositely projecting tubular receptacles having the cross-shaft received therein and being in turn respectively received in said semi-cylindrical receptacles; and a pair of clamps embracing respective undersides of the tubular receptacles and being releasably secured to the main frame.

* * * * *